United States Patent [19]
Okamoto

[11] Patent Number: 5,318,350
[45] Date of Patent: Jun. 7, 1994

[54] ARRANGEMENT OF SEAT BELT ANCHOR IN AUTOMOTIVE SEAT

[75] Inventor: Hikonori Okamoto, Akishima, Japan
[73] Assignee: Tachi-S Co., Ltd., Akishima, Japan
[21] Appl. No.: 978,135
[22] Filed: Nov. 18, 1992
[51] Int. Cl.[5] .................. B60R 22/00; A47C 31/00
[52] U.S. Cl. ........................... 297/468; 297/482
[58] Field of Search ........................... 297/468, 482

[56] References Cited

U.S. PATENT DOCUMENTS

| 4,729,602 | 3/1988 | Tokugawa | 297/468 |
| 4,783,122 | 11/1988 | Komomara | 297/482 |
| 4,790,597 | 12/1988 | Bauer et al. | 297/468 |

Primary Examiner—Alexander Grosz
Attorney, Agent, or Firm—Oldham, Oldham & Wilson, Co.

[57] ABSTRACT

An arrangement of a seat belt anchor in an automotive seat, wherein a base bracket is provided at a lateral wall of a seat cushion of the seat, a cover member is securely attached over the base bracket in a generally closed way, an opening or recessed portion is formed in the cover member, and a lid member is fitted to the opening or recessed portion A seat belt connected with the seat belt anchor passes through the lid member or between the lid member and recessed portion, extending outwardly therefrom. The seat belt anchor is disposed between the base bracket and cover member or between the recessed portion and lid member.

Accordingly, this arrangement improves outer aesthetic appearance around the seat belt achor and prevents invasion of dusts and freign matters into the inside of the cover member and seat belt anchor.

13 Claims, 5 Drawing Sheets

ARRANGEMENT OF SEAT BELT ANCHOR IN AUTOMOTIVE SEAT

BACKGROUND OF INVENTION

1. Field of the Invention

The present invention relates to an arrangement of a seat belt anchor in an automotive seat, and in particular to an arrangement for covering the seat belt anchor in the seat.

2. Description of Prior Art

Reference is made to FIGS. 1 and 2, which shows a typical conventional seat belt anchoring arrangement found in the automotive seat. According thereto, as shown in FIG. 2, an anchor member (11') is mounted on a reclining device bracket (5'). The anchor member (11') is connected to a seat belt (1'). Although not shown clearly, a reclining device is mounted on the bracket (5') such that the upper arm of the reclining device is connected to the lower side of a seat back (SB'), while the lower arm of the same is fixed on the bracket (5'), thereby allowing the seat back (SB') to be adjustably inclined forwardly and backwardly relative to the seat cushion (SC'). The bracket (5') is fixed fast on a slide rail (SR').

Those bracket (5'), reclining device, and seat belt anchor member (11') are normally covered with a cover member (C) in order to maintain the appearance of the seat aesthetically. The cover member (C) is formed with a cut-away portion (C2) through which the seat belt (1') passes. Also, the cover member (C) is attached laterally of the seat cushion (SC') by means of several securing brackets (C3). Some of the securing brackets (C3) are, as shown, fixed to the extension of an upper rail (SR1') associated with the slide rail (SR').

However, with this conventional arrangement, it has been found that the cut-away portion (C2) is defined relatively wider, and due to the interposition of such securing brackets (C3), there is a spacing between the inward edges of the cover member (C) and the lateral wall (SC1') of seat cushion (SC'). This hitherto construction leads to the drawbacks that (i) dust or small foreign materials or particles are dropped through those cut-away portion (C2) and spacing, and accumulated within the cover member (C) as well as upon the reclining device and seat belt anchor member (11'), which lowers the durability and operation of the reclining device and seat belt anchor (11'), and (ii) the cut-away portion (C2) of cover member (C) is still objectionable, in that the cut-away portion (C2) per se presents an uneven irregularity or poor design effect from the aesthetic viewpoint and is thus insufficient to improve the outward aesthetic appearance of the cover member (C), especially in the spot where the seat belt (1') crosses or extends outwardly from the cut-away portion (C2), and additionally the interior within the cover member (C) can easily be viewed through that cut-away portion (22).

SUMMARY OF THE INVENTION

In view of the above-stated drawbacks, it is therefore a purpose of the present invention to provide an arrangement of seat belt anchor in an automotive seat, which is improved in its outer aesthetic appearance and prevents invasion of dust and foreign matter into the inside thereof.

In order to attain such purpose, in accordance with the present invention, there is basically provided an arrangement of seat belt anchor in an automotive seat, wherein a base bracket means is provided at a lateral wall of a seat cushion of the seat, on which base bracket means, the seat belt anchor and reclining device are mounted, a cover means is attached securely over the base bracket means, an opening is formed in that cover means, a lid means is fitted in the opening, which has a hole through which the seat belt passes, and the seat belt anchor is disposed within both base bracket and cover means, while the seat belt extends outwardly from the lid means.

Accordingly, both base bracket and cover means are coupled together to provide a generally closed enclosure body, in which are disposed the seat belt anchor and reclining device, thus avoiding invasion of dusts and foreign matters thereinto and further preventing the interior of base bracket and cover means from being viewed from the outside. Moreover, a neatly and continuously finished outer appearance can be achieved around the seat belt anchor as well as the cover mans, thus contributing to further improvement of outer aesthetic appearance of the seat.

Preferably, the cover means is of a shape conforming generally to an outer contour of the base bracket means, and both cover means and base bracket means are formed at their respective peripheral ends with projected peripheral flanges, so that both cover and base bracket means may be coupled together along their peripheral flanges so as to effectively provide such generally closed enclosure body.

Preferably, the opening of the cover means and the matable lid means may respectively be provided with a pair of securing lugs and a pair of securing legs elastically engageable therewith.

Preferably, the foregoing hole of the lid means is of a shape slightly larger than the cross-sectional dimensins of the seat belt.

In one aspect of the invention, in place of the above-stated opening, a recessed portion may be formed in the cover means, and the lid means be formed without the hole such as to be engageable with such recessed portion, with an opening defined between those recessed portion and lid means, so that the seat belt anchor and adjacent part of the seat belt are accommodated between the recessed portion and lid means, with the seat belt extending outwardly from such opening. In such case, preferably, the recessed portion may be defined in the cover means in an upwardly inclined fashion.

BRIEF DESCRIPTION OF THE DRAWINGS

FIG. 7 is a partly broken, schematic sectional view taken along the line VIII—VIII in FIG. 7.

DETAILED DESCRIPTION OF PREFERRED EMBODIMENTS OF THE INVENTION

Figure 1:
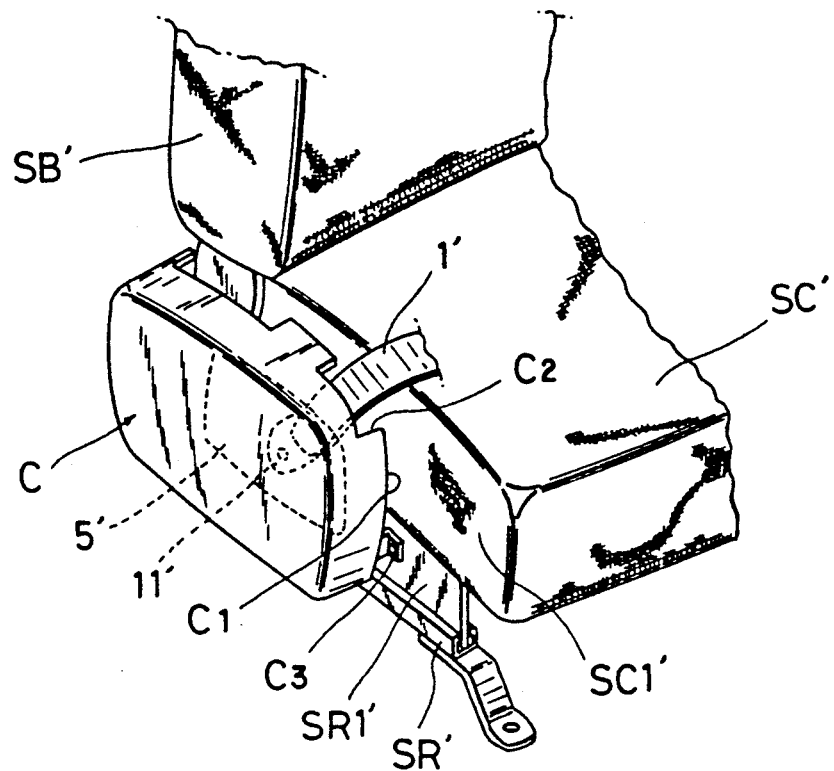
FIG. 1 is a partly broken, schematic perspective view of an automotive seat with a conventional seat belt anchor arrangement.
Figure 2:
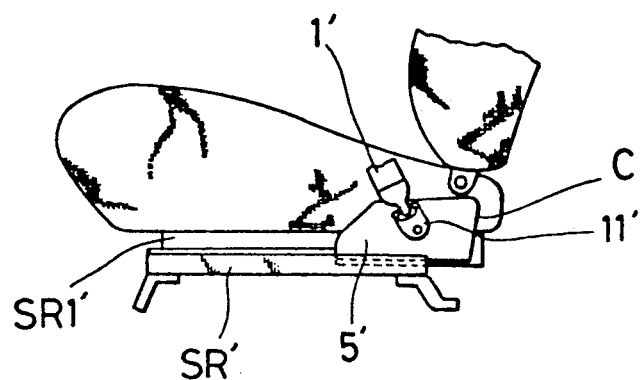
FIG. 2 is a partly broken, schematic side view of the automotive seat.
Figure 3:
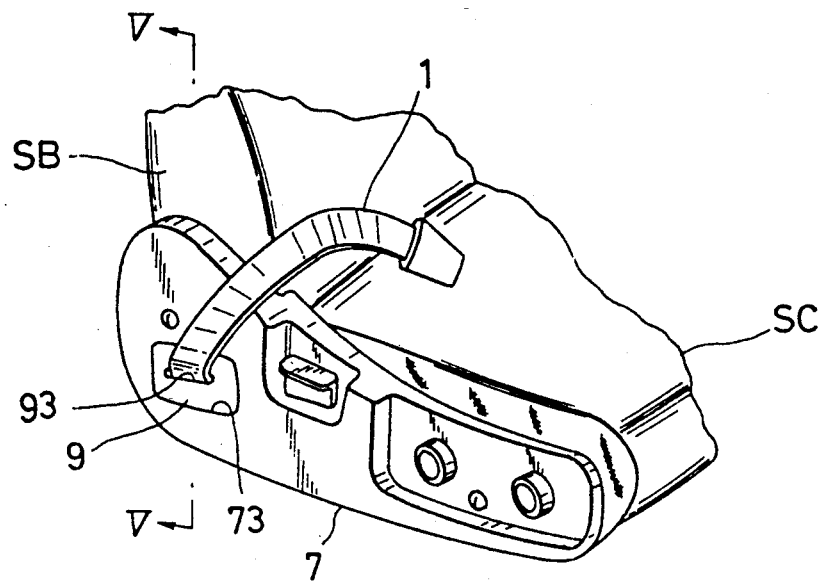
FIG. 3 is a partly broken, schematic perspective view of an automotive seat with a seat belt anchor arrangement in accordance with a first embodiment of the present invention.
Figure 4:
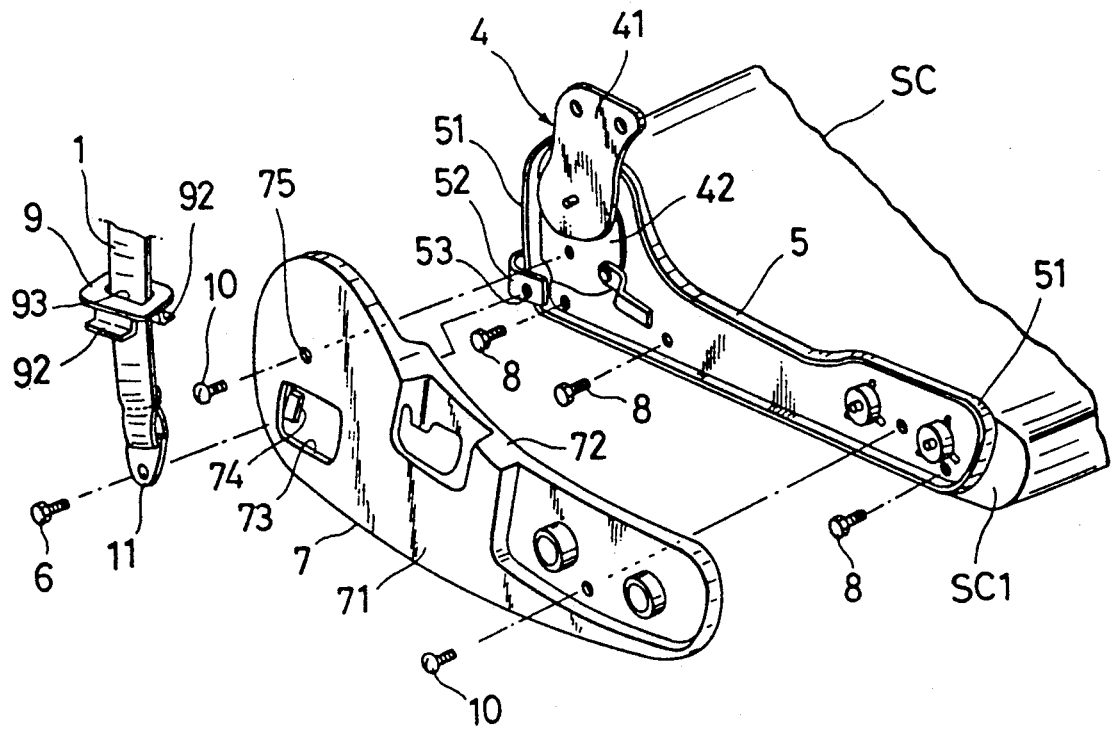
FIG. 4 is a exploded schematic view of principal accordance with the first embodiment of the invention.
Figure 5:
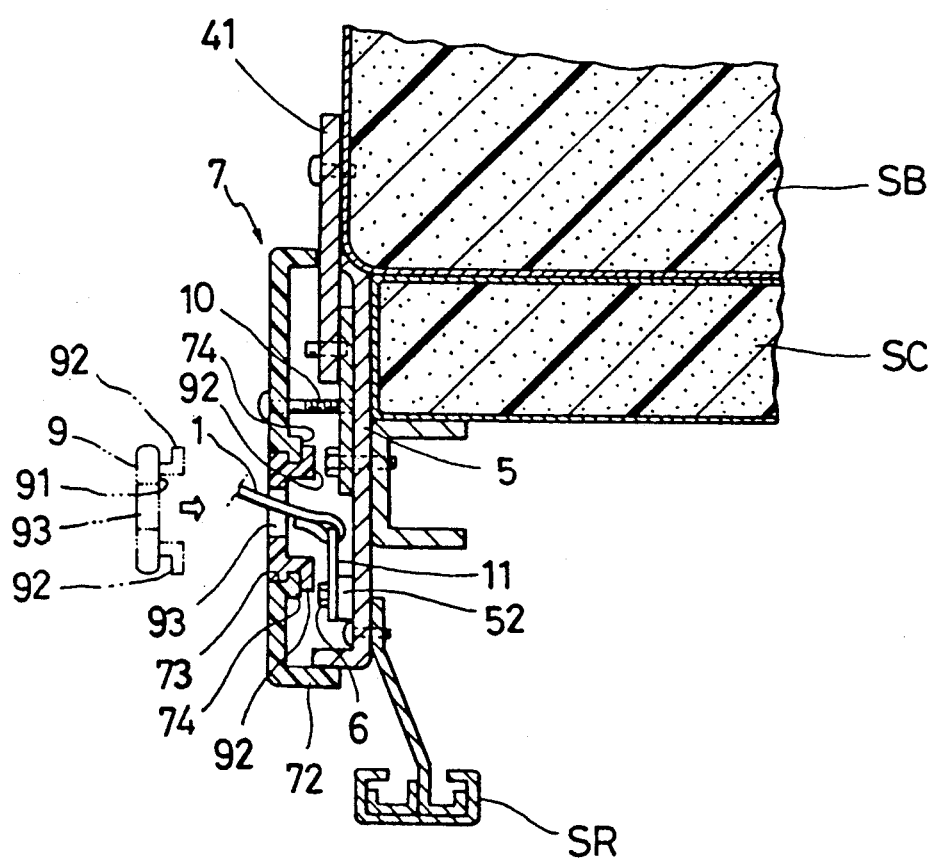
FIG. 5 is a partly broken, schematic sectional view taken along the line V—V in FIG. 3.

Referring now to FIGS. 3 through 5, there is illustrated a first embodiment of a seat belt anchor arrangement in an automotive seat according to the present invention. The seat comprises a seat cushion (SC) and a seat back (SB), both which are connected together via a reclining device which is generally designated by (4).

As shown in FIG. 4, firmly attached to one lateral wall (SC1) of a seat cushion (SC), is a base bracket (5) by means of bolts (8). The base bracket (5) has a peripheral flange (51) formed at its peripheral edges, projecting outwardly therefrom and extending generally perpendicularly relative thereto.

Rearwardly of the base bracket (5), there is provided a reclining device (4). The reclining device (4), through not shown as a whole, is depicted in FIG. 4 to have a lower arm (42) and an upper arm (41). The lower arm (42) is fixedly mounted on the rearward area of base bracket (5), while the upper arm (41) is pivotally coupled to the lower arm (42).

A seat belt anchor mount (52) is fixedly provided at the rearward end of the base bracket (5) in the neighborhood of the lower arm (42). The mount (52) is turned in an "L" shape from the base bracket (5) towards the inside thereof, terminating in a mount area in which is formed an internally threaded hole (53).

In accordance with the present invention, there is provided a cover member (7) which is formed in a shape conforming generally to the outer contour of the foregoing base bracket (5), such that the whole outer contour dimensions of cover member (7) are slightly larger than those of the base bracket (5). The cover member (7), as illustrated, is formed at its peripheral edges with an inwardly projected peripheral flange (72). Similarly to the flange (51) of base bracket (5), that peripheral flange (72) extends generally perpendicularly relative to the cover member (7), and further is so dimensioned as to fit engage over the peripheral flange (51) of base bracket (5), as can be seen from FIGS. 3, 4 and 5.

The cover member (7) still further has, formed at its rearward part, a securing hole (75) and a seat belt anchor storage opening (73). The opening (73) is defined at a location corresponding to the foregoing seat belt anchor mount (52), so that a seat belt anchor (11) connected with a seat belt (1) may be inserted through the opening (73) into the inner side of cover member (7) and fixed into the mount (52). In this respect, a bolt (6) is threadedly engaged into the internally threaded hole (53) of the mount (52), to thereby firmly fix the seat belt anchor (11) thereto. As can be seen from Figs. 4 and 5, at such opening (73), there are formed a pair of securing lugs (74), integrally, in the inward wall of the cover member (7). The two securing lugs (74) are disposed respectively at the right and left edges of cover member (7) which define the corresponding right and left sides of the opening (73), as viewed from FIG. 4, and further project inwardly of the opening (73). The opening (73), as shown, is generally of a rectangular shape. Preferably, the cover member (7) is made of a relatively hard synthetic resin material.

Designation (9) represents an opened lid member having an opening (93) through which the seat belt (1) passes. The lid member (9) is of a rectangular shape conforming generally to that of the foregoing opening (73), and the opening (93) is of a shape slightly larger than the cross-sectional dimensions of the seat belt (1). As in FIG. 4, the lid member (9) has been attached to the seat belt (1) prior to assembling both cover member (7) and seat belt anchor (11) with the base bracket (5).

The lid member (9) has a pair of hook-like securing legs (92) integral therewith, each being disposed on the opposite sides of the opening (93). Preferably, the lid member (9) and legs (2) are made of a relatively soft synthetic resin material. The lid member (9) is of a size slightly smaller than that of the opening (93), so that the lid member may be fitted in the opening in registry with each other.

With this structure, the assembling steps involve firstly inserting the anchor (11) through the opening (73), then fixing the former (11) to the mount (52), thereafter securely attaching the cover member (7) to the base bracket (5) via bolts (10), and finally fitting securely the lid member (9) over the opening (73) of cover member (7) via the elastic engagement of the lid member securing legs (92) with the respective cover member securing legs (74). Consequently, as in FIG. 3, the thus-assembled lid and cover members (9)(7) present a neatly and continuously finished appearance around the seat belt anchor (11) as well as the cover member (7) per se. It is thus appreciated that the base bracket (5) and cover member (7) are coupled together to provide a generally closed enclosure body, which not only prevents invasion of dusts or small foreign matters thereinto, but also prevents the interior of cover member (7) from being viewed, in addition to giving such neat and continuous appearance. Those advantageous effects are also true with the lid member (9) which closes the opening (73) and whose opening (93) almost closely surrounds the part of the seat belt (1) adjacent to the anchor (11).

Designation (SR) denotes a slide rail which is connected to and supports the base bracket (5), as shown in FIG. 5.

FIGS. 6 through 9 illustrate a second embodiment of the present invention. In this embodiment, there are provided another lid member (190) in place of the foregoing lid member (9), and another cover member (170) having a recessed portion (173) formed at its rearward area, in place of the foregoing cover member (7). It should be understood that, excepting those elements, all other members and set used in the present second embodiment are the same with those in the first embodiment above.

Figure 7:
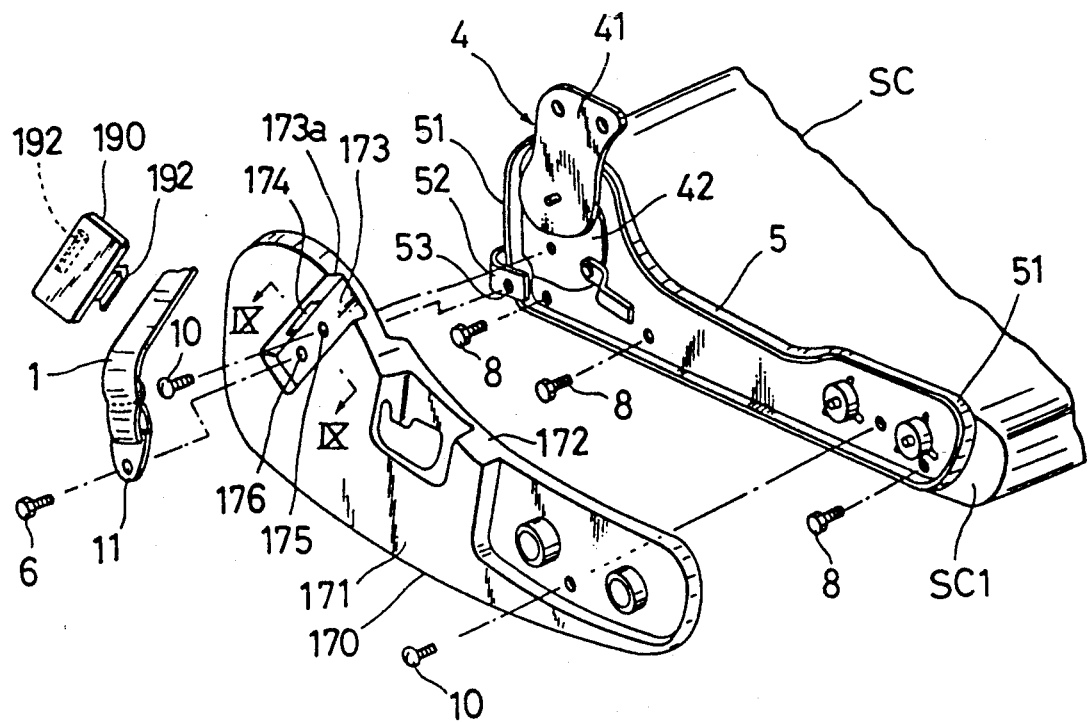
FIG. 7 is a partly broken, schematic perspective view of a principal part in the second embodiment of the invention.
Figure 8:
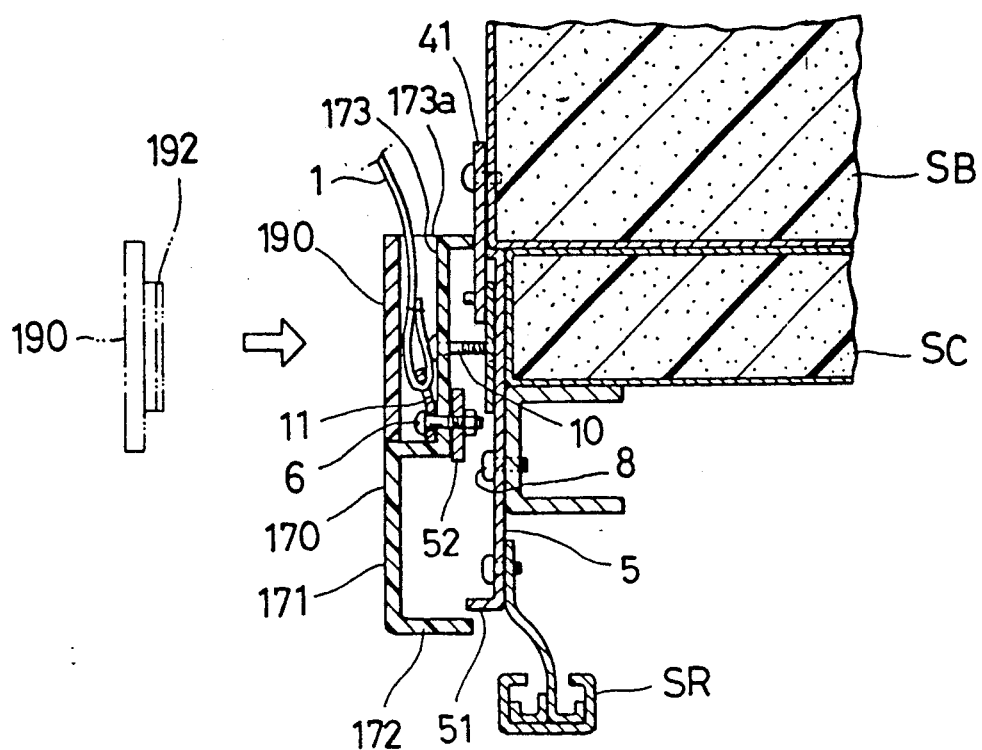
Figure 9:
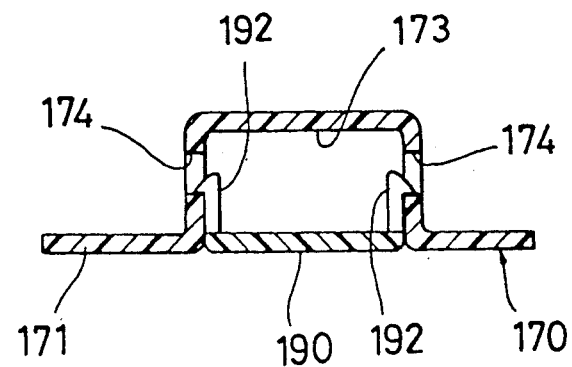
FIG. 9 is an partially enlarged view of a recessed portion formed in a cover member and lid member fitted in the recessed portion in accordance with the second embodiment of the invention.

As best shown in FIG. 7, the recessed portion (173) is defined in the rearward area of cover member (170), such that an opening (173) is defined at the upper corner of the cover member (170) where the peripheral flange (172) thereof extends at a generally right angle from the vertical planar surface thereof, and further the recessed portion (173) per se is inclined upwardly towards the seat cushion (SC). In the flat bottom wall of that recessed portion (173), an upper hole (175) and lower hole (176) are formed. The lower hole (176) are situated in alignment with the hole (53) of seat belt anchor mount (52). Also, in both lateral walls of the same recessed portion (173), a pair of elongated holes (174)(174) are formed, into which are respectively engaged a pair of securing legs of the lid member (190), as shown in FIG. 9.

Figure 6:
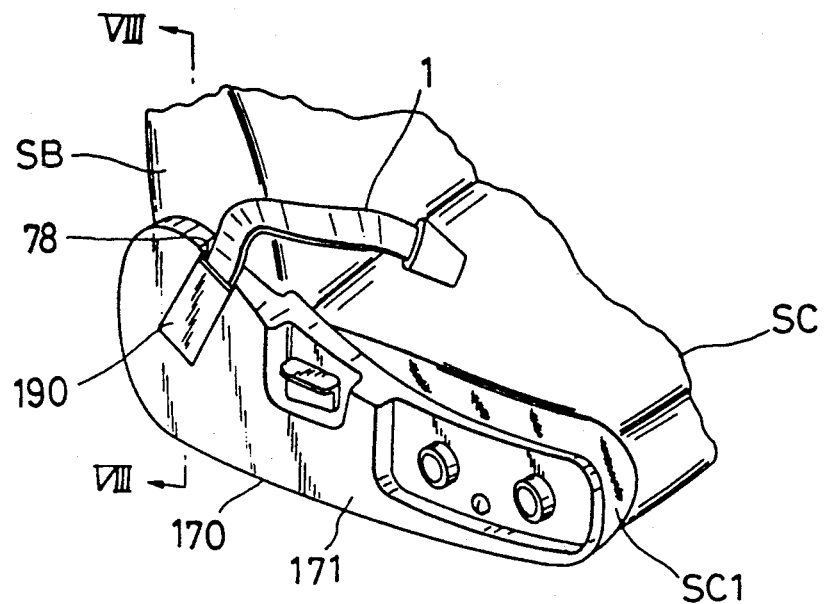
FIG. 6 is a partly broken automotive seat with a seat belt anchor arrangement in accordance with a second of the present invention.

The cover member (170) is shown in FIG. 6 to have an inwardly projected peripheral flange (172) formed at the peripheral edges, as similar to the cover member (7) of the first embodiment. Such flange (172) is also adapted to be fit engage over the flange (51) of the base bracket (50). It is noted that both cover members (170) and (7) in both first and second embodiments are basically identical to each other in shape and construction, excepting the seat belt anchor arrangement, as state above.

In contrast to the first embodiment, the assembling steps, according to this second embodiment, consists in firstly attaching firmly the cover member (170) over the base bracket (5) by means of the bolt (10) (as in FIG. 7, the bolt (10) is inserted through the upper hole (175) in the recessed portion (173) and threadedly engaged into the hole of the lower arm (42) of reclining device (4).), then placing the seat belt anchor (11) and adjacent end part of seat belt (1) onto the recessed portion (173), then securing firmly the anchor (11) to the flat bottom wall of recessed portion (173) by means of bolt (6) (as in FIG. 7, the bolt (6) passes through the coaxially aligned two holes (176)(53) and is threadedly engaged into the hole (53).), and thereafter, fitting the lid member (190) into the recessed portion (173) through elastic latching engagement of the two lid member securing legs (192) into the respective two holes (174) of recessed portion (173). Hence, there is obtained such neatly and continuously finished appearance of both cover member (170) and seat belt anchor portion.

While having described the present invention as above, it should be understood that the invention is not limited to the illustrated embodiments, but any other modifications, replacements and additions may be applied thereto without departing from the scopes of the appended claims.

What is claimed is:

1. An arrangement of a seal belt anchor in an automotive seat, in which the seat includes a seat cushion having a lateral wall, and a seat back being connected with said seat via a reclining device, and said seat belt anchor is disposed at said seat cushion, and, a seal belt which extends outwardly from said seat belt anchor,
    said arrangement comprising:
    a base bracket means provided at said lateral wall of seat cushion, wherein said seat belt anchor and reclining device are mounted on said base bracket means;
    a cover means attached securely over said base bracket means;
    an opening means defined in said means, through which opening means, said seat belt passes, extending exteriorly of said cover means from said seat belt anchor located inside said cover means; and
    a lid means fitted in said opening means.

2. The arrangement as defined in claim 13, wherein said said cover means is of a shape conforming generally to an outer contour of said base bracket means, and wherein both said cover means and base bracket means are engaged together to provide a substantially closed enclosure in which are disposed said seat belt anchor and reclining device.

3. The arrangement as defined in claim 2, wherein said base bracket means comprises a base bracket having an outwardly projected peripheral flange formed at the peripheral edges, wherein said cover means comprises a cover member having, formed at the peripheral edges, a peripheral flange engageable over said outwardly projected peripheral flange of said base bracket, and wherein said cover member is engaged fit with said base bracket along their respective peripheral flanges.

4. The arrangement as defined in claim 1, wherein said opening is provided with a securing means and wherein said lid means is provided with a securing means engageable with said securing means of said opening.

5. The arrangement as defined in claim 4, wherein said securing means of said opening comprises a pair of securing lugs disposed on opposite sides of said opening, and wherein said securing means of said lid means comprises a pair of securing legs each being elastically engageable with the respective of said securing lugs.

6. The arrangement as defined in claim 1, wherein said hole of said lid means is of a shape slightly larger than a cross-sectional dimensions of said seat belt.

7. The arrangement as defined in claim 1, wherein said opening is formed generally in a rectangular shape, and wherein said lid means comprises a plate-like lid member which is also formed generally in a rectangular shape at a size slightly smaller than that of said opening, so that said lid member may be fitted in said opening in registry with each other.

8. The arrangement of a seat belt anchor in an automotive seat according to claim 1 wherein said opening means is an opening perforated through said cover means, and said lid means has a hole formed therein through which said seat belt passes.

9. The arrangement as set forth in claim 1 wherein a recessed portion is formed in said cover means, and said opening means is defined between said recessed portion and said lid means fitted in said recessed portion, through which opening means, said seat belt passes.

10. The arrangement as defined in claim 9 wherein said base bracket means includes a mount for said seat belt anchor and said recessed portion is provided with a hole for fixing said seat belt anchor to said mount, wherein a bolt is inserted through said hole and fixed to said mount at said base bracket.

11. The arrangement as defined in claim 9 wherein said said recessed portion has a width generally equal to that of both said seat belt anchor and said seat belt.

12. The arrangement as defined in claim 9, wherein said recessed portion is formed with a pair of securing holes, and wherein said lid means is provided with a pair of securing legs, each being elastically engageable into the respective said pair of securing holes.

13. The arrangement as defined in claim 9, wherein said recessed portion is defined in said cover in an upwardly inclined fashion.

* * * * *